United States Patent [19]

Buken et al.

[11] 4,204,224

[45] May 20, 1980

[54] PROCESS AND APPARATUS FOR MEASURING THE LENGTH OF MOVING SHAPED ARTICLES PARTICULARLY RED-HOT SEMIFINISHED ARTICLES

[76] Inventors: Gunther Buken, Im Börner 41, 6462 Geinhausen 2; Raimund Lang, Friedenstrasse 5, 8755 Alzenau 2, both of Fed. Rep. of Germany

[21] Appl. No.: 911,840

[22] Filed: Jun. 2, 1978

[30] Foreign Application Priority Data

Jun. 4, 1977 [DE] Fed. Rep. of Germany ....... 2725353

[51] Int. Cl.[2] .............................................. H04N 7/18
[52] U.S. Cl. ..................................... 358/107; 358/100; 358/101
[58] Field of Search .......................... 358/100, 101, 107

[56] References Cited

U.S. PATENT DOCUMENTS

| | | | |
|---|---|---|---|
| 3,254,226 | 5/1966 | Bobula | 358/107 |
| 3,908,077 | 9/1975 | Stut | 358/107 |
| 4,064,534 | 12/1977 | Chen | 358/107 |
| 4,118,732 | 10/1978 | Ichijima | 358/101 |
| 4,131,490 | 12/1978 | Oishi | 358/101 |
| 4,135,204 | 1/1979 | Davis | 358/101 |

*Primary Examiner*—Howard W. Britton
*Attorney, Agent, or Firm*—Cushman, Darby & Cushman

[57] ABSTRACT

There is described a process and apparatus for non-contact measurement of the length of a moving shaped body, and particularly of red-hot semifinished products, by scanning the body with a high-speed camera, characterized in that after a starting signal is triggerd by the side of the shaped body which lies in the direction of movement, a high-speed television camera is triggered which is aligned on a window located at a distance $l_1$ from the point where the starting signal is triggered, and determines the length $l_2$ of the end of the moving shaped body which projects into the window by means of a slotted diaphragm moving at a high rate of speed and connected to a counter, in which the sum of $l_1$ and $l_2$ gives the total length of the moving object or body.

8 Claims, 1 Drawing Figure

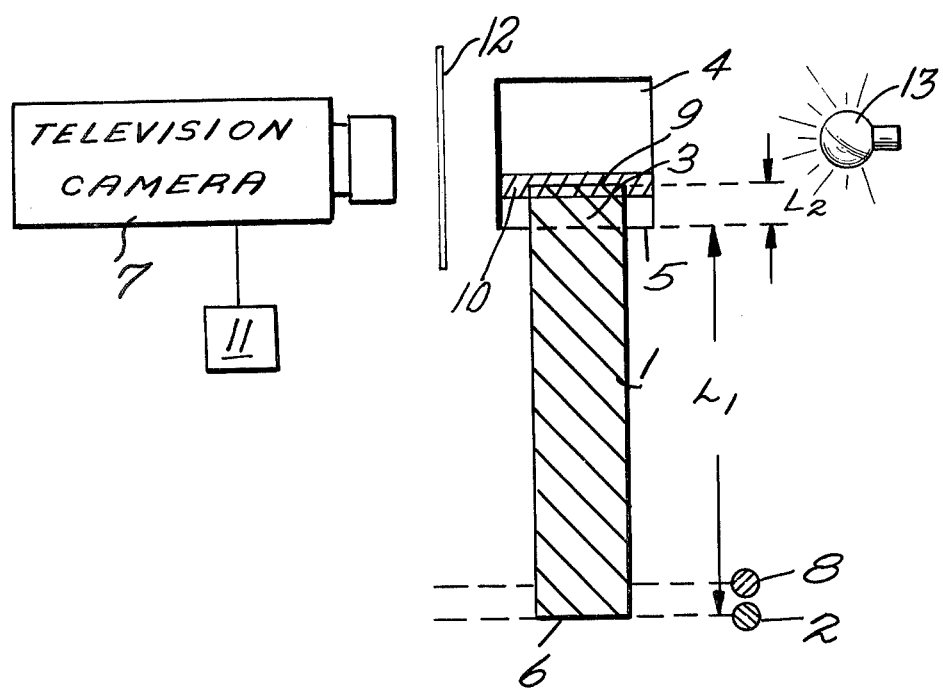

PROCESS AND APPARATUS FOR MEASURING THE LENGTH OF MOVING SHAPED ARTICLES PARTICULARLY RED-HOT SEMIFINISHED ARTICLES

BACKGROUND OF THE INVENTION

The object of the invention is the development of a process and apparatus for non-contact measurement of the length of moving shaped bodies, and particularly of red-hot semifinished articles, by scanning the object with a high-speed television camera.

The production of metallic tubes, round stock and other profiles or shapes is accomplished by extrusion presses, among other things. When this is done, red-hot ingots are rerouted to the rolling machine on a roller device after the free fall from the extrusion press installation, for example. The exact knowledge of the total length of the ingot is critical for the further processing of it, because scrap waste and return motion—i.e., economic aspects—depend on it.

The exact measurement of the length of such starting materials or semifinished articles before entering the roller presents a problem since it must be accomplished on the red-hot moving bodies. A corresponding problem in measurement under the same difficult conditions also arises, for example, in rolling sheet metal on hot rolling trains. Up to the present, obtaining an exact measurement of the length (better than $\pm 1$ cm) of these parts failed because no methods were known by which non-contact measurements could be made on the moving object at a speed corresponding to the rhythm of production. Processes that are based on infrared radiation failed because of the so-called "halo" of the glowing parts.

Therefore, it was the task of the present invention to find a process and a device for accomplishing non-contact measurement of the length of moving shaped bodies, and particularly red-hot semifinished products, by means of which a reliable accuracy of measurement of better than $\pm 1$ cm is obtained.

SUMMARY OF THE INVENTION

This problem was solved according to the invention by triggering a high-speed television camera after the triggering of a starting signal by the side of the shaped article or body lying in the direction of movement, with the television camera being aligned on a window located at a distance $l_1$ from the point where the starting signal is triggered and determine the length $l_2$ of the end of the moving shaped body which projects into the window by means of a slotted diaphragm moving at a high rate of speed and connected to a counter, in which the sum of $l_1$ and $l_2$ gives the total length of the moving objects.

The length $l_1$ is always adjusted in such a way that it is only a little bit smaller than the total length l that is to be expected, and as a result the shaped body does not fill the entire height of the window, for this would make a measurement impossible.

BRIEF A DESCRIPTION OF THE DRAWING

The single FIGURE of the drawing shows the apparatus in schematic form.

DESCRIPTION OF THE PREFERRED EMBODIMENT

The process of the invention is described in more detail in an embodiment provided as an example with the help of the drawing.

The red-hot ingot 1 falls freely from an extrusion press installation. The ingot 1, in doing so, strikes a permanent stop or a light barrier 2, while the other end 3 of the ingot projects into a measurement window 4 whose lower edge 5 is located at a distance $l_1$ from the light barrier 2, with the distance $l_1$ being selected so that it is somewhat less than the length l of the ingot to be measured. From the position of the permanent stop or light barrier 2 and the lower edge 5 of the measurement window, the fixed partial length $l_1$ of the ingot 1 is obtained. In order to measure the entire length l of the ingot 1, the variable partial length $l_2$, which is obtained from the distance from the other edge 9 of the ingot to the lower edge 5 of the measurement window, must be added to the fixed partial length $l_1$ in order to obtain the total length $l = l_1$ and $l_2$. In doing so, the measurement of this length $l_2$ is accomplished by observing the measurement window surface, for example, with a quadratic lateral length of 50 cm, by the lens through a television camera 7.

As soon as one end 6 of the ingot has reached the permanent stop or the light barrier 2, a signal is triggered with which the process of scanning by the television camera 7 is started. By this means, an apertured stop or slit 10 which is connected with a counter 11 is pushed over the window 4 upward from below with a frequency of 1-20 kHz and preferably with approximately 2000 Hertz. When the edge 9 of the ingot is reached, a signal is given off which stops the counter that is connected to the slit or apertured stop. The position of the counter is a measurement for the length $l_2$ and can be calibrated directly in a unit of length. Here, the time duration of the scanning process is less than 1 millisecond, so that the error in measurement through the ingot which continues to move, is smaller than 1 cm.

In order to avoid measurement errors as a result of the diffuse infrared range (known as the so-called "halo") of the red-hot ingots, a camera with a scanning interrogator is preferred which is equipped with a blue filter 12. The red-hot body is irradiated from behind with a source of cold light 13, preferably a xenon lamp, so that nothing but the actual shadow image of the ingot is evaluated on the television image and not an image that is adulterated by infrared radiation.

At the stop 2 for the end 6 of the ingot, a source of cold light with a blue filter is also preferably located. With a second light barrier 8 at a short distance from the permanent stop or light barrier 2, measurement errors can be avoided because of the so-called "pills" of short length which frequently fall through in front of the ingot. An evaluation only takes place when both barriers give a signal at the same time. In any case, the accuracy of measurement of the determination of $l_2$ is better than $\pm 1$ cm even then.

By means of digital evaluation of the camera interrogator, it is possible to store lengths and evaluate them.

The process is not susceptible to trouble because there are no moving parts and both measurement and evaluation are electronic.

With the process and device of the invention it is also possible—in addition to measuring the extension in length of moving red-hot shaped bodies—to measure their width and height, too, by an appropriate arrangement of other measurement windows and cameras.

What is claimed is:

1. A process for the non-contact measurement of the length of a moving shaped body wherein there is provided a high-speed television camera for scanning the body, providing a window, providing a slotted diaphragm and a counter, said process comprising triggering a starting signal by the side of the shaped body which lies in the direction of movement, said starting signal triggering said camera which is aligned on said window, said window being located at a distance $l_1$ from the point where the starting signal is triggered and determining the length $l_2$ of the end of the moving shaped body which projects into the window by means of the slotted diaphragm which is moving at a high rate of speed and the counter connected to said slotted diaphragm by stopping the counter when the slotted diaphragm reaches the edge of the shaped body, in which the sum of $l_1$ and $l_2$ gives the total length of the moving body.

2. The process of claim 1 wherein the body is a red-hot semifinished product.

3. The process of claim 2 comprising irradiating the red-hot shaped body with a source of cold light and employing a television camera having a blue filter.

4. The process of claim 2 wherein there are provided a pair of light barriers located at a short distance, from each other and said process comprises triggering the starting signal by moving the shaped body past the pair of light barriers.

5. A device for the non-contact measurement of the length of a moving shaped body comprising a high-speed television camera means to scan a moving shaped body, light barrier means, measurement window means located at a distance $l_1$ from said light barrier means, said camera means being aligned on said window means, said light barrier means being adapted to trigger a signal causing said camera means to scan said window, a slotted diaphragm means adapted to project into said window at high speed and counter means connected to said diaphragm for measuring the length $l_2$ of the end of the shaped body projecting into said measurement window means.

6. The device of claim 5 wherein said light barrier means comprises a pair of light barriers a short distance apart.

7. The device of claim 6 including a source of cold light adapted to irradiate said shaped body and wherein said camera means and light barrier means are provided with blue filters.

8. The device of claim 7 wherein said camera means includes means for digital evaluation of body lengths.

* * * * *